US000001550H

United States Statutory Invention Registration [19]

[11] Reg. Number: H1550

Hoshino

[45] Published: Jun. 4, 1996

[54] SILVER HALIDE PHOTOGRAPHIC EMULSION

[75] Inventor: Hiroyuki Hoshino, Hino, Japan

[73] Assignee: Konica Corporation, Hino, Japan

[21] Appl. No.: 339,297

[22] Filed: Nov. 10, 1994

Related U.S. Application Data

[63] Continuation of Ser. No. 160,799, Dec. 3, 1993, abandoned.

[30] Foreign Application Priority Data

Dec. 21, 1992 [JP] Japan ..... 4-340610

[51] Int. Cl.[6] ..... G03C 1/005

[52] U.S. Cl. ..... 430/567; 430/604; 430/608

[58] Field of Search ..... 430/567, 604, 430/608

[56] References Cited

U.S. PATENT DOCUMENTS

| | | | |
|---|---|---|---|
| 4,431,731 | 2/1984 | Sugimoto et al. | 430/604 |
| 4,981,780 | 1/1991 | Inoue et al. | 430/567 |
| 4,990,437 | 2/1991 | Iijima et al. | 430/567 |
| 5,068,173 | 11/1991 | Takehara et al. | 430/567 |
| 5,219,720 | 6/1993 | Black et al. | 430/567 |

FOREIGN PATENT DOCUMENTS 0437859 7/1991 European Pat. Off. .

2130389 5/1984 United Kingdom .

OTHER PUBLICATIONS

Pearlman et al., "Silver Halide Emulsions Prepared From Sprayed Molten Silver Halides: II. The Photographic Effects of Cationic and Anionic Addenda," 571 Photographic Science & Engineering, vol. 24, No. 3, May/Jun. 1980, pp. 149–155.

*Primary Examiner*—Charles T. Jordan
*Assistant Examiner*—Chrisman D. Carroll
*Attorney, Agent, or Firm*—Finnegan, Henderson, Farabow, Garrett & Dunner

[57] ABSTRACT

Disclosed is a silver halide photographic light-sensitive emulsion comprising silver halide grains, wherein the silver halide constituent of said silver halide grains is substantially composed of at least one constituent selected from silver bromide or silver iodobromide, and said emulsion contains at least one kind of indium compound.

17 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOGRAPHIC EMULSION

This application is a continuation of application Ser. No. 08/160,799, filed Dec. 3, 1993, now abandoned.

FIELD OF THE INVENTION

This invention relates to a silver halide photographic emulsion applicable to a silver halide photographic light-sensitive material and, particularly, to a silver halide photographic emulsion having improved in sensitivity and graininess.

BACKGROUND OF THE INVENTION

In recent years, such a photographing apparatus as a camera has been popularized in progress, and a photographing opportunity has also been increased. Accordingly, there has been increased in the demands for making a silver halide photographic light-sensitive material higher in sensitivity and image quality.

One of the dominant factors for making a silver halide photographic light-sensitive material higher in sensitivity and image quality is a silver halide grain. Such a silver halide grain as is aimed at making sensitivity and image quality higher have so far been developed in progress by the art.

However, as has generally been developed so far, there has been a tendency to lower a sensitivity as the grain size of the silver halide grain has been made smaller for improve the image quality, so that there has been a limitation to make both sensitivity and image quality higher.

For making sensitivity and image quality more higher, there have been some techniques for improving a ratio of sensitivity/grain size per one silver halide grain. Among the above-mentioned techniques, the techniques in which a tabular-shaped silver halide grain is used have been described in, for example, Japanese Patent Publication Open to Public Inspection (hereinafter referred to as JP OPI Publication) Nos. 58- 111935/1983, 58-111936/1983, 58-111937/1983, 58-111927/1983 and 59-99433/1984. As compared such a tabular-shaped silver halide grain to a regular-crystallized silver halide grain having, for example, octahedron and hexahedron, the surface area of the former tabular-shaped silver halide grain becomes larger than that of the latter when both silver halide grains have each the same volume. Therefore, the former silver halide grain has such an advantage that a more higher sensitivity can be provided, because more sensitizing dyes can be adsorbed to the surface of the former.

JP OPI Publication No. 63-92942/1988 discloses a technique in which a core having a high silver iodide content is contained inside a tabular-shaped silver halide grain; JP OPI Publication No. 63-151618/1988 discloses a technique in which a hexahedral tabular-shaped silver halide grain is used; and JP OPI Publication No. 63-163451/1988 discloses a technique in which a tabular-shaped silver halide grain is so used as to have a ratio of a grain thickness to the farthest distance from and to the twinned crystal surfaces of not higher than 5. These techniques show each the effects on sensitivity and graininess.

As described above, in addition to the technique in which a high sensitivity can be made higher by improving the structure and form of a grain, there is also another known technique in which the movements of photoelectron and positive hole are improved inside a silver halide grain by doping a metal ion in the silver halide grain, so that the photographic characteristics can be renovated.

As for the techniques in which a metal ion is so added as to achieve a high sensitization, JP OPI Publication Nos. 61-160739/1986 and 62-260137/1987 disclose each the techniques in which a polyvalent metal salt such as those of lead and cadmium is added; and JP OPI Publication No. 1-121844/1989 discloses a technique in which an iron compound is doped in a narrow band-gapped layer comprising a grain having a multilayered structure. Besides, each of JP OPI Publication Nos. 2-20852/1990, 2-20853/1990, 2-20854/1990, 2-222653/1990 and 2-224545/1990 discloses the technique in which a polyvalent metal and a novel ligand are used in combination.

SUMMARY OF THE INVENTION

It is an object of the invention to provide a silver halide photographic emulsion capable of providing a silver halide photographic light-sensitive material excellent in a fog-sensitivity relation and in graininess.

Another object of the invention is to provide a silver halide photographic emulsion capable of providing a silver halide photographic light-sensitive material excellent in latent image preservability.

The objects of the invention can be achieved with a silver halide photographic emulsion having the following structure;

(1) A light-sensitive photographic emulsion containing light-sensitive silver halide grains comprising substantially silver bromide and/or silver iodobromide, which also contains at least one kind of indium compound; and (2) A light-sensitive silver halide photographic emulsion as claimed in claim 1, wherein the light-sensitive silver halide grains thereof are of the core/shell type.

DETAILED DESCRIPTION OF THE INVENTION

The silver halide grains applicable to the invention comprise substantially silver bromide and/or silver iodobromide. The expression, "— substantially comprise silver bromide and/or silver iodobromide—", herein means that it may also contain other silver halides than silver bromide or silver iodobromide, such as silver chloride, provided that the effects of the invention shall not be spoiled. In the case of silver chloride, to be more concrete, the content thereof is preferably not more than 1 mol %.

The silver halide grains to be contained in a silver halide photographic emulsion of the invention may have either such a regular crystal form as a cube, an octahedron and a tetradecahedron, or such an irregular crystal form as the spherical form and a tabular form. For these grains, those having any ratio of {100} plane to {111} plane may be used. And, it is also allowed to use those having a complex of the above-mentioned crystal forms and those having a mixture of various crystal forms. Among them, it is preferable to use twinned crystal silver halide grains having two {111} twin planes parallel to each other.

The term, "a twinned crystal", herein means a silver halide crystal having one or more twinned crystal planes in a grain. The classification of the twinned crystal forms is detailed in, for example, A Report made by Klein and Moisar in "Photographishe Korrespondenz", Vol. 99, p.99 and, ibid., Vol. 100, p. 57.

When making use of tabular-shaped silver halide grains in the invention, it is preferable that an average aspect ratio of the thickness of a tabular-shaped grain to a grain size thereof (hereinafter referred to as an aspect ratio) is to be preferably less than 5, more preferably within the range of not less than 1.1 to less than 4.5 and, particularly not less than 1.2 to less than 4. The above-mentioned average aspect ratio can be obtained by averaging the ratios of the grain sizes of the whole tabular-shaped grains to the thicknesses thereof.

The diameter of a silver halide grain is indicated by the projected area thereof converted into a circular form, (i.e., the diameter of a circle having the same projected area as that of the grain). The diameter thereof is to be preferably within the range of 0.1 to 5.0 μm, more preferably 0.2 to 4.0 μm and, particularly 0.3 to 3.0 μm.

As for the silver halide photographic emulsions relating to the invention, any one of those may be used, such as a polydisperse type emulsion having a relatively wide grain-size distribution and a monodisperse type emulsion having a relatively narrow grain-size distribution. Among them, a monodisperse type emulsion is preferably used.

In a monodisperse type silver halide emulsion an amount of silver halide by weight contained within the range of ±20% of an average grain size r is to be preferably not less than 60% of the whole silver halide grain by weight, more preferably not less than 70% and particularly not less than 80% thereof.

The above-mentioned term, "an average grain size r", is herein defined as a grain size ri obtained when maximizing a product $ni \times ri^3$ wherein ni represents a frequency of grains having a grain size ri (and, the significant figures are three and the figure of the lowest column is rounded).

The term, "a grain size" herein means a diameter obtained when the projected image of a silver halide grain is converted into a circular image having the same area.

The above-mentioned grain size can be obtained in the following manner for example. A subject grain is magnified 10,000 to 70,000 times by an electron microscope; the magnified grain image is photographed; and the printed grain size or the projected area thereof is practically measured, (provided, the number of the subject grains are not less than 1,000 grains at random.)

When a grain size distribution is defined by the following formula,

Grain size distribution(%)

=(Standard deviation/Average grain size)×100 a highly monodisperse type emulsion preferably applicable to the invention has a grain size distribution of not more than 20% and preferably not more than 15%.

The above-mentioned average grain sizes and standard deviations are obtained from the above-defined grain size ri.

In the invention, when making use of silver iodobromide as a silver halide, the silver iodide content thereof is to be within the range of, preferably not less than 0.1 mol % to not more than 15 mol %, more preferably not less than 5 mol % to not more than 12 mol %, and particularly not less than 6 mol % to not more than 10 mol % in terms of an average silver iodide content of the whole silver halide grain.

There shall be no special limitation to the silver halide composition of the silver halide grains relating to the invention. It is therefore allowed that the silver halide composition inside a grain may substantially be uniform, may also be continuously varied, or may be of the so-called core/shell type. For achieving a sensitization effectively, a core/shall type silver halide grain is used. In this case, the grains are to be provided inside with a highly silver iodide containing phase having a silver iodide content of preferably not less than 8 mol %, more preferably within the range of 10 to 45 mol % and particularly 20 to 40 mol %.

In a silver halide grain having a highly silver iodide containing phase inside a grain of the invention, the outermost layer thereof is formed of a silver iodide containing phase having a silver iodide content less than that of the highly silver iodide containing phase. In the low silver iodide containing phase for forming the outermost layer, the silver iodide content thereof is preferably not more than 10 mol %, more preferably not more than 6 mol % and particularly within the range of 0 to 4 mol %.

It is also allowed to make present an interlayer having a different silver iodide content between the outermost layer and the highly silver iodide containing phase. The interlayer is to have a silver iodide content within the range of preferably 10 to 22 mol % and more preferably 12 to 20 mol %. The differences of the silver iodide contents between the outermost layer and the interlayer and between the interlayer and the highly silver iodide containing phase are each preferably not less than 6 mol % and more preferably not less than 10 mol %.

In the above-mentioned embodiment, it is also allowed to make present another silver halide phase in the center of the high silver iodide containing phase inside a grain, between the highly silver iodide containing phase and the interlayer each inside a grain, and/or between the interlayer and the outermost layer.

The volume of the outermost layer is preferably within the range of preferably 4 to 70% of the whole grain and more preferably 10 to 50 mol %. The volume of the highly silver iodide containing phase is preferably within the range of preferably 10 to 80% of the whole grain and more preferably 20 to 50 mol %. The volume of the interlayer is preferably within the range of preferably 5 to 60% of the whole grain and more preferably 20 to 55 mol %.

The above-mentioned phases may be substantially any single phases having a uniform composition, the group consisting of plural phases having uniform compositions each variable stepwise, any continuous phases having the compositions continuously variable in any one of the phases, or the combination of the above-mentioned phases.

From the view points of the grain size distribution and productivity, it is preferred to prepare the silver halide grains applicable to the silver halide photographic emulsions of the invention in the following manner. An aqueous solution containing protective colloid and seed grains are put in a reaction chamber in advance and, if required, silver ions, halogen ions or silver halide fine grains are supplied thereto, and the seed grains are grown up to be crystallized thereby. The seed grains can be prepared in a single-jet method or a controlled double-jet method of which has been well-known in the art. When making use of such a seed grain in the invention, the silver halide thereof is substantially comprised of silver bromide or silver iodobromide.

When making use of the seed grains in the invention, the seed grains may be either of the regularly crystallized forms such as a cube, an octahedron and a tetradecahedron, or of the irregularly crystallized forms such as a spherical form and a tabular form. For these grains, those having any ratio of {100} plane to {111} plane may be used. It is also allowed to use those having a complex of the above-mentioned crystal forms or those having a mixture of variously crystallized grains. Among them, it is preferable to use twinned crystal silver halide grains having two {111} twinned planes parallel to each other.

As for the means for preparing a silver halide photographic emulsion relating to the invention, a variety of methods well-known in the art can be used. To be more concrete, a single-jet method, double-jet method and a triple-jet method, for example, may be used in combination. It is also allowed to use a method for controlling a pAg and a pH so as to meet the silver halide growing rate, in a liquid phase in which silver halide is produced.

A silver halide photographic emulsion of the invention can also be prepared in any one of an acidic method, a neutral method and an ammoniacal method.

In preparing a silver halide photographic emulsion of the invention, halide ions and silver ions may be mixed up at the same time or one of them may also be mixed in the other. It is also allowed that, while taking the critical silver halide crystal growing rate into consideration, halide ions and silver ions are added gradually or at the same time while controlling the pH and pAg thereof in a mixing chamber, so that the silver halide crystals may be grown up. It is further allowed that, in any step for preparing silver halide, the silver halide composition of grains may be varied in a conversion method. It is still further allowed that halide ions and silver ions are formed into silver halide fine grains and the fine grains are supplied to a mixing chamber.

In preparing a silver halide photographic emulsion of the invention, it is allowed to make present a well-known silver halide solvent such as ammonia, thioether and thiourea.

To the silver halide grains to be contained in a silver halide photographic emulsion of the invention, a cadmium salt, a zinc salt, a lead salt, a thallium salt, an iridium salt (including the complex salts thereof), a rhodium salt (including the complex salts thereof) and an iron salt (including the complex salts thereof) may be so added as to contain the above-mentioned metal elements inside and/or on the grain surfaces. It is also allowed that a reduction-sensitization nuclei may be provided inside and/or on the grain surfaces by putting them in a suitable reducible atmosphere.

The silver halide grains to be contained in a silver halide emulsion of the invention may be those capable of forming a latent image mainly on the surfaces thereof or mainly inside thereof.

After completing the growth of silver halide grains, unnecessary soluble salts may be removed from a silver halide photographic emulsion of the invention or may be contained as they are in the emulsion. When removing the salts, the salts may be removed in the method described in, for example, Research Disclosure (hereinafter abbreviated to RD), No. 17643, Paragraph 11.

The indium compounds to be contained in a silver halide photographic emulsion of the invention may be monovalent, divalent or trivalent. Among them, a trivalent one is preferable, because it is readily available and stable.

Besides a halide, an oxide, a sulfide, a nitride and a hydroxide, it is also allowed to use a variety of indium compounds such as a sulfate, a nitrate, an oxalate, a halogenocomplex salt, an organic indium compound and an indium acid salt.

Now, the concrete examples of the indium compounds applicable to the invention will be given below. However, the invention shall not be limited thereto.

| | |
|---|---|
| $InCl_3.nH_2O$ | $(NH_4)_3.[InF_6]$ |
| $InBr_3.nH_2O$ | $K_3InCl_6.2H_2O$ |
| $InI_3.nH_2O$ | $(NH_4)_2.[InCl_5(H_2O)]$ |
| $In_2O_3$ | $(CH_3)_4NInCl_4$ |
| $In_2S_3$ | $[C_5H_5N.HCl]_3InCl_4$ |

-continued

| | |
|---|---|
| InN | $(NH_4)_2InBr_5.H_2O$ |
| $In(OH)_3.nH_2O$ | $K_3InBr_6.2H_2O$ |
| $In_2(SO_4)_3.nH_2O$ | $(CH_3)_4NInBr_4$ |
| $In(NO_3)_3.3H_2O$ | In |
| $In_2(CrO_4)_3.6H_2O)$ | |

In a silver halide photographic emulsion of the invention, it is allowed to use a method for adding the additive generally well-known in the art to the silver halide photographic emulsion. For example, these compounds are dissolved in advance in a suitable organic solvent typified by an alcohol or in water and the solution thereof is then added in. Also, for a method for dispersing a spectrally sensitizing dye, such a dispersion method as described in, for example, JP Application No. 4-714/1990 can be used. To be more concrete, a metal complex of the invention is added in an amount exceeding the solubility thereof in an aqueous system without substantially having any organic solvent and/or any surfactant, so that the resulting solution is dispersed mechanically in solid fine grains having a grain size of not larger than 1 μm and the resulting dispersion is then added to the silver halide photographic emulsion of the invention.

In the invention, the indium compound may be added at the point of time in the course of carrying out any one of the preparing steps for a silver halide photographic emulsion. However, it may be added preferably within the period from a step for forming grains to the point of time before starting a chemically sensitizing step and more preferably at the point of time before completing the growth of silver halide grains.

For containing an indium compound in a silver halide photographic emulsion of the invention, a solution containing the indium compound is directly added in the silver halide photographic emulsion. When it is added in the course of growing silver halide grains, it is also allowed that the indium compound is added in advance to an aqueous solution containing halide ions, an aqueous solution containing silver ions or a solution containing silver halide fine grains. A solution containing the indium compound may be added instantly or may also be added continuously by making use of any arbitrary function.

In the invention, an indium compound is to be added in an amount within the range of preferably not less than $1.0\times10^{-8}$ mols to not more than $1.0\times10^{-1}$ mols per mol of silver halide grain used, more preferably not less than $1.0\times10^{-7}$ mols to not more than $1.0\times10^{-2}$ mol and most preferably not less than $1.0\times10^{-6}$ mols to not more than $10\times10^{-3}$ mols.

When preparing a silver halide photographic emulsion relating to the invention, the optimum conditions can be selected and, about the conditions other than the above, the well-known processing conditions may be referred to, for example, JP OPI Publication Nos. 61-6643/1986, 61-14630/1986, 61-112142/1986, 62-157024/1987, 62-18556/1987, 63-92942/1988, 63-151618/1988, 63-163451/1988, 63-220238/1988 and 63- 311244/1988.

A silver halide photographic emulsion of the invention can be applied preferably to a silver halide color photographic light-sensitive material.

When a color photographic light-sensitive material is prepared by making use of a silver halide photographic emulsion of the invention, the silver halide photographic emulsion having been physically, chemically and spectrally sensitized is to be used. The additives applicable to such a processing step are given in RD Nos. 17643, 18716 and 308119. The pages and paragraphs corresponding to the additives are given will be shown below.

| Additive | [RD308119] Page | Paragraph | [RD17643] Page | [RD18716] Page |
|---|---|---|---|---|
| Chemical sensitizer | 996 | III-A | 23 | 648 |
| Spectral sensitizer | 996 | IV-A-A, B, C, D, H, I, J | 23–24 | 648–649 |
| Supersensitizer | 996 | IV-A-E, J | 23–24 | 648–649 |
| Antifoggant | 998 | VI | 24–25 | 649 |
| Stabilizer | 998 | VI | 24–25 | 649 |

When a color photographic light-sensitive material is prepared by making use of a silver halide photographic emulsion of the invention, the well-known photographic additives applicable thereto are also given in the above-mentioned RDs. The pages and paragraphs corresponding thereto will be given below.

| Additive | [RD308119] Page | Paragraph | [RD17643] Page | [RD18716] Page |
|---|---|---|---|---|
| Color stain preventive | 1002 | VII-I | 25 | 650 |
| Dye-image stabilizer | 1001 | VII-J | 25 | |
| Whitening agent | 998 | V | 24 | |
| UV absorbent | 1003 | VIII-C, XIII-C | 25–26 | |
| Light absorbent | 1003 | VIII | 25–26 | |
| Light scattering agent | 1003 | VIII | | |
| Filter dye | 1003 | VIII | 25–26 | |
| Binder | 1003 | IX | 26 | 651 |
| Antistatic agent | 1006 | XIII | 27 | 650 |
| Layer hardener | 1004 | X | 26 | 651 |
| Plasticizer | 1006 | XII | 27 | 650 |
| Lubricant | 1006 | XII | 27 | 650 |
| Activator Coating acid | 1005 | XI | 26–27 | 650 |
| Matting agent | 1007 | XVI | | |
| Developing agent (contained in a light sensitive material) | 1011 | XX-B | | |

When a color photographic light-sensitive material is prepared by making use of a silver halide photographic emulsion of the invention, a variety of couplers may be used. The typical examples of the couplers are given in the following RDs. The pages and paragraphs corresponding thereto will be given below.

| Additive | [RD308119] Page | Paragraph | [RD17643] Paragraph |
|---|---|---|---|
| Yellow coupler | 1001 | VII-D | VII-C-G |
| Magenta coupler | 1001 | VII-D | VII-C-G |
| Cyan coupler | 1001 | VII-D | VII-C-G |
| Colored coupler | 1002 | VII-G | VII-G |
| DIR coupler | 1001 | VII-F | VII-G |
| BAR coupler | 1002 | VII-F | |
| Other useful residual group-releasing coupler | 1001 | VII-F | |
| Alkali-soluble coupler | 1001 | VII-E | |

When a color photographic light-sensitive material is prepared by making use of a silver halide photographic emulsion of the invention, an additive applicable thereto can be added in such a dispersion method as described in, for example, RD 308119, p. 1007, paragpraph XIV.

When a color photographic light-sensitive material is prepared by making use of a silver halide photographic emulsion of the invention, such a support as described in, for example, RD 17643, p. 28, RD 18716, pp. 647–648 and RD 308119, p. 1009, paragraph XVII can be used.

To a color photographic light-sensitive material applied with a silver halide photographic emulsion of the invention, such an auxiliary layer as a filter layer and an interlayer each described in, for example, the foregoing RD 308119, paragraph VII-K may be provided.

A color photographic light-sensitive material applied with a silver halide photographic emulsion of the invention may have various layer arrangements such as a normal layer arrangement, an inverse layer arrangement and a unit layer arrangement each described in, for example, RD 308119, paragraph VII-K.

A silver halide photographic emulsion of the invention can preferably be applied to a variety of color photographic light-sensitive materials typified by a color negative film for general or movie use, a color reversal film for slide or TV use, a color paper, a color positive film and a color reversal paper.

A color photographic light-sensitive material applied with a silver halide photographic emulsion of the invention can be developed in such an ordinary method as described in, for example, the foregoing RD 17643, pp. 28–29, RD 18716, p. 615 and RD 308119, paragraph XIX.

EXAMPLES

Now, the invention will be detailed with reference to the following examples. However, the embodiments of the invention shall not be limited thereto.

EXAMPLE 1

(Preparation of Em-A)

Monodispersed silver iodobromide octahedral grains were prepared by making use of monodispersed silver iodobromide regular crystal seed emulsion (of 0.0775 mols in terms of silver content) having an average size (i.e., a side length converted into a cube having the same volume) of 0.28 μm, a silver iodide content (in a uniform composition) of 2 mol % and a size distribution of 18.9% and the following three kinds of solutions.

| | |
|---|---|
| Solution A1 | |
| Ossein gelatin | 33.9 g |
| A 10% Compound I ethanol solution* | 10.0 cc |
| Aqueous 28% ammonia solution | 51.8 cc |
| Water | 3383 cc |
| Solution B1 | |
| Ossein gelatin | 32.9 g |
| Potassium bromide | 402.8 g |
| Potassium iodide | 1.5 g |
| Water | 1471 cc |
| Solution C1 | |
| Silver nitrate | 586.8 g |
| Aqueous 28% ammonia solution | 478.7 cc |
| Water | 1031 cc |

*Compound I: Sodium polyisopropylene.polyethyleneoxy.disuccinate (that was also used for preparing Em-M)

The silver iodobromide regular crystal seed emulsion was added to Solution A1 and, while keeping the resulting solution at 40° C. and stirring it, Solution B1 was acceleratingly added thereto at the same flow rate by taking 150 minutes. At this time, the pH and pAg thereof were controlled by making use of an aqueous acetic acid solution and an aqueous potassium bromide solution as shown in Table 1. After completing the addition, a desalting treatment was carried out in an ordinary method and 56 g of ossein gelatin was then added. After that, the pH and EAg thereof were adjusted (at 40° C.) to be 6.0 and 100 mV, so that Em-A was prepared. From the result of observing the resulting Em-A through a scanning type electron microscope, Em-A was proved to be comprised of monodispersed octahedral grains (containing iodine of 2 mol %) having an average grain size of 1.0 μm.

TABLE 1

| | | | | | |
|---|---|---|---|---|---|
| Amount of silver added | 0% | → | 10% | → | 100% |
| pH | 9.0 | → | 9.0 | → | 8.0 |
| pAg | 9.7 | → | 9.7 | → | 10.5 |

(Preparation of Em-B)

Em-B was prepared in the same manner as in Em-A, except that the following solution was used in place of Solution B1 used for preparing Em-A. From the result of observing Em-B through a scanning electron microscope, Em-B was proved to be comprised of monodispersed octahedral grains (containing iodine of 4.4 mol %) having an average grain size of 1.0 μm. However, in the preparation, the adding rate and the pAg were adjusted a little so as to inhibit the small grain production and to uniform the final grain configuration to be octahedral.

| Solution B1 for Em-B | |
|---|---|
| Ossein gelatin | 32.9 g |
| Potassium bromide | 392.5 g |
| Potassium iodide | 25.9 g |
| Water | 1470 cc |

(Preparation of Em-C, D)

Em-C and Em-D were each prepared in the same manner as in Em-A, except that Solution B1 used for preparing Em-A was replaced by Solutions B1-1 and B1-2 as shown in Table 2, respectively.

From the result of observing Em-C and Em-D through a scanning electron microscope, Em-C and Em-D were each proved to be comprised of monodispersed octahedral grains (containing iodine of 4.5 mol % in Em-C and 6 mol % in Em-D) having an average grain size of 1.0 μm, respectively. However, as same as in Em-B, the adding rate and the pAg were adjusted a little so as to inhibit the small grain production and to uniform the final grain configuration to be octahedral.

TABLE 2

| | Solution B1-1 | Solution B1-2 |
|---|---|---|
| Em-C Ossein gelatin | 10.4 g | 22.5 g |
| Potassium bromide | 116.6 g | 275.9 g |
| Potassium iodide | 18.0 g | 7.9 g |
| Water | 462 cc | 1008 cc |
| Em-D Ossein gelatin | 10.4 g | 22.5 g |
| Potassium bromide | 110.1 g | 275.9 g |
| Potassium iodide | 27.0 g | 7.9 g |
| Water | 462 cc | 1008 cc |

(Preparation of Em-E, Em-F, Em-G, Em-H)

Em-E, Em-F, Em-G and Em-H were each prepared in the same manner as in Em-A, Em-B, Em-C and Em-D, except that lead nitrate was added, in an amount of $1.0\times10^{-4}$ mols per mol of silver based on the whole silver content, to Solution A1, respectively.

(Preparation of Em-I, Em-J, Em-K and Em-L)

Em-I, Em-J, Em-K and Em-L were each prepared in the same manner as in Em-E, Em-F, Em-G and Em-H, except that lead nitrate was replaced by indium (III) chloride, respectively.

From the results of observing Em-E through Em-L through a scanning type electron microscope, they were each proved to be monodisperse type octahedral grains having an average grain size of 1.0 μm, respectively.

(Preparation of Emulsion-1)

A part of Em-A was heated up to 50° C. and dissolved. Sensitizing dyes (A) and (B) were added thereto in the amounts of 100 mg and 90 mg per mol of silver halide, respectively. The resulting mixture was then adsorbed for 15 minutes. Further, sodium thiosulfate pentahydrate, chloroauric acid and ammonium thiocyanate were added thereto in the amounts of $3.5\times10^{-6}$ mols, $1.0\times10^{-6}$ mols and $4.0\times10^{-4}$ mols per mol of silver halide, respectively. After the resulting mixture was ripened for 120 minutes, 4-hydroxy-6-methyl- (1,3,3a, 7)-tetrazaindene was added as a stabilizer and was then cooled down and solidified, so that Emulsion-1 was prepared.

Sensitizing dye (A)

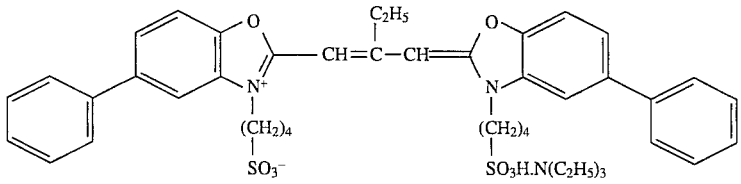

Sensitizing dye (B)

-continued

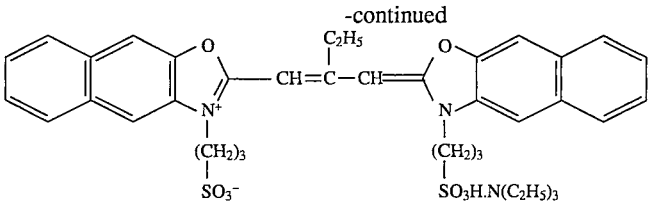

Sensitizing dyes (A) and (B) were also used for preparing Emulsion-13.

(Preparation of Emulsion-2 through Emulsion-12)

Emulsion-2 through Emulsion-12 were each prepared in the same manner as in Emulsion-1, except that Em-A was replaced by Em-B through Em-L, respectively.

Preparation of monodisperse emulsion layer coated samples 101 through 112

Coated samples 101 through 112 were each prepared by coating the resulting Emulsion-1 through Emulsion-3 on a subbed triacetyl cellulose support in accordance with the following coating formulas and the resulting coated samples were then dried up.

(Coating formulas)

The following layers were coated in this order on the support.

| | |
|---|---|
| Layer 1: A green-sensitive silver halide emulsion layer | |
| Emulsion . . . An amount of silver coated | 2.5 g/m² |
| Magenta coupler (M-1) | 0.01 mols/mol of Ag |
| Colored magenta coupler (CM-1) | 0.005 mols/mol of Ag |
| DIR compound (D-1) | 0.0002 mols/mol of Ag |
| HBS-I (Tricresyl phosphate, TCP) | 0.22 g/m² |
| Layer 2: A Yellow filter layer | |
| Emulsified dispersion of yellow colloidal silver and 2,5-di-t-octyl hydroquinone, and H-I (Sodium 2,4-dichloro-6-hydroxy-s-triazine) | |

M-I

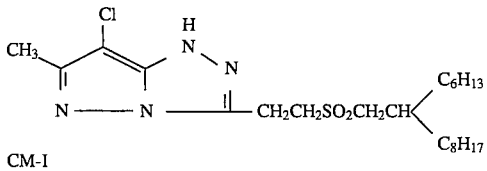

CM-I

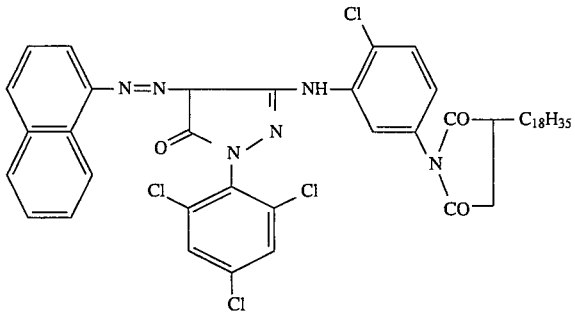

D-I

-continued

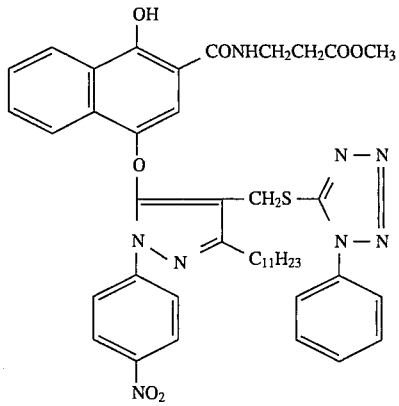

(Evaluation of sensitometric results)

After the resulting coated samples 101 through 112 were each exposed wedgewise to green light, they were processed in the following processing steps. And, the characteristic curves thereof were made out. Then, the fog density, relative sensitivity and RMS graininess of each sample were each obtained. (Wherein the relative sensitivity was indicated by a value relative to the reciprocal of an exposure quantity capable of giving a density of a fog density + 0.1; and the RMS graininess was indicated by a value relative to the value of the standard deviation of a density obtained when scanning a dye image having a density of a fog density + 0.4 through a microdensitometer having a circular-shaped scanning aperture of 25 μm.)

| Processing steps (at 38° C.) | |
|---|---|
| Color developing | 2 min. 50 sec. |
| Bleaching | 6 min. 30 sec. |
| Washing | 3 min. 15 sec. |
| Fixing | 6 min. 30 sec. |
| Washing | 3 min. 15 sec. |
| Stabilizing | 1 min. 30 sec. |
| Drying | |

The composition of the processing solutions used in the processing steps were as follows.

| (Color developer) | |
|---|---|
| 4-amino-3-methyl-N-ethyl-N-(β-hydroxyethyl) aniline sulfate | 4.75 g |
| Sodium sulfite anhydride | 4.25 g |
| Hydroxylamine ½ sulfate | 2.0 g |
| Potassium carbonate anhydride | 37.5 g |
| Sodium bromide | 1.3 g |
| Trisodium nitrilotriacetate (monohydrate) | 2.5 g |
| Potassium hydroxide | 1.0 g |
| Add water to make | 1 liter |
| Adjust pH to be | 10.0 |

-continued

| | |
|---|---|
| (Bleacher) | |
| Iron ammonium ethylenediamine tetraacetate | 100.0 g |
| Diammonium ethylenediamine tetraacetate | 10.0 g |
| Ammonium bromide | 150.0 g |
| Glacial acetic acid | 10.0 g |
| Add water to make | 1 liter |
| Adjust pH with aqueous ammonia to be | 6.0 |
| (Fixer) | |
| Ammonium thiosulfate | 175.0 g |
| Sodium sulfite.anhydride | 8.5 g |
| Sodium metasulfite | 2.3 g |
| Add water to make | 1 liter |
| Adjust pH with acetic acid to be | 6.0 |
| (Stabilizer) | |
| Formalin (in an aqueous 37% solution) | 1.5 cc |
| Konidux (manufactured by Konica Corp.) | 7.5 cc |
| Add water to make | 1 liter |

The results of the evaluation of coated samples 101 through 112 will be shown in Table 3 below.

TABLE 3

| Sample No. | Average AgI content | Grain structure (in AgI content) | Compound added (Amt added per mol of Ag) | Fog | Sensitivity | RMS graininess | Invention/ Comparison |
|---|---|---|---|---|---|---|---|
| 101 | 2 mol % | 2 mol %/2 mol % | — | 0.15 | 100 | 100 | Comparison |
| 102 | 4.4 mol % | 2 mol %/4.5 mol % | — | 0.11 | 81 | 81 | Comparison |
| 103 | 4.5 mol % | 2 mol %/10 mol %/2 mol % | — | 0.13 | 142 | 76 | Comparison |
| 104 | 6 mol % | 2 mol %/15 mol %/2 mol % | — | 0.12 | 165 | 72 | Comparison |
| 105 | 2 mol % | 2 mol %/2 mol % | Lead nitrate (in $1 \times 10^{-4}$ mols) | 0.18 | 124 | 127 | Comparison |
| 106 | 4.4 mol % | 2 mol %/4.5 mol % | Lead nitrate (in $1 \times 10^{-4}$ mols) | 0.12 | 97 | 84 | Comparison |
| 107 | 4.5 mol % | 2 mol %/10 mol %/2 mol % | Lead nitrate (in $1 \times 10^{-4}$ mols) | 0.15 | 180 | 86 | Comparison |
| 108 | 6 mol % | 2 mol %/15 mol %/2 mol % | Lead nitrate (in $1 \times 10^{-4}$ mols) | 0.15 | 205 | 84 | Comparison |
| 109 | 2 mol % | 2 mol %/2 mol % | Indium chloride (III) (in $1 \times 10^{-4}$ mols) | 0.16 | 122 | 105 | Invention |
| 110 | 4.4 mol % | 2 mol %/4.5 mol % | Indium chloride (III) (in $1 \times 10^{-4}$ mols) | 0.12 | 108 | 86 | Invention |
| 111 | 4.5 mol % | 2 mol %/10 mol %/2 mol % | Indium chloride (III) (in $1 \times 10^{-4}$ mols) | 0.13 | 170 | 75 | Invention |
| 112 | 6 mol % | 2 mol %/15 mol %/2 mol % | Indium chloride (III) (in $1 \times 10^{-4}$ mols) | 0.13 | 215 | 75 | Invention |

As is apparent from the results shown in Table 3, the emulsions each containing an indium compound relating to the invention were proved to be more effective as a means for achieving a sensitization without accompanying any fog increase nor any graininess deterioration. When making use of core/shell type silver halide grains as silver halide grains, it was also proved that much better sensitizing effects can be induced without spoiling any fog prevention and any graininess (in particular, the graininess), by making use of an indium compound.

EXAMPLE-2

(Preparation of Em-M)

Core/shell type silver iodobromide twinned crystal grains having a low aspect ratio were prepared by making use of monodispersed spherical silver bromide twinned crystal grains having an average grain size of 0.3 μm and a grain-size distribution of 16.8% (of which the proportion of two parallel twinned crystals was 89% in number) for serving as the seed grains, and the following solutions.

| Solution A2 | |
|---|---|
| Ossein gelatin | 262.5 g |
| A 10% compound I and ethanol solution | 1.5 cc |
| Aqueous 28% ammonia solution | 528.0 cc |
| Aqueous 56% acetic acid solution | 795.0 cc |
| Add water to make | 4450 cc |

An aqueous 3.5N potassium bromide solution containing ossein gelatin in a proportion of 4.0% by weight Solution C2

An aqueous 3.5N ammoniacal silver nitrate solution, (of which the pH was adjusted to be 9.0 with ammonium nitrate.)

Solution D2

A fine-grained emulsion comprising gelatin of 3% by weight and silver iodide grains (having an average grain size of 0.04 μm)

Solution E2

A fine-grained emulsion comprising gelatin of 3% by weight and silver iodobromide grains (having a silver iodide content of 1 mol % and an average grain size of 0.04 μm)

The procedures for preparing Solutions D2 and E2 were as follows.

(Preparation of Solution D2)

Two liters of an aqueous solution containing 7.06 mols of silver nitrate and 2 liters of an aqueous solution containing 7.06 mols of potassium iodide were added each by taking 10 minutes, respectively, to 5 liters of a 6.0% by weight of ossein gelatin solution containing 0.06 mols of potassium iodide. In the course of forming the fine-grains, the pH was kept at 2.0 by making use of nitric acid and the temperature was kept at 30° C. After completing the grain formation, the pH was adjusted to be 6.0 with an aqueous sodium carbonate solution.

(Preparation of Solution E2)

Two hundred cubic centimeters (200 cc) of an aqueous solution containing 7.06 mols of silver nitrate, and 2 liters of an aqueous solution containing 6.99 mols of potassium bromide and 0.07 mols of potassium iodide were added each by taking 10 minutes, respectively, to 5 liters of a 6.0% by weight ossein gelatin solution containing 0.06 mols of potassium bromide. In the course of forming the fine-grains, the pH was kept at 2.0 by making use of nitric acid and the temperature was kept at 30° C. After completing the grain formation, the pH was adjusted to be 6.0 with an aqueous sodium carbonate solution.

Solution A2 was kept at 70° C., pAg 7.8 and pH 7.2 in a reaction chamber and, while stirring well, a seed emulsion in an amount equivalent to 0.286 mols was added thereto. Thereafter, Solutions B2, C2 and D2 were each accelerat-ingly added up so that a proportion of silver added could be 78% by taking 140 minutes in a triple-jet method at a flow rate necessary to make the silver halide composition shown in Table 4. Successively, Solution E2 was added in a proportion of 28% equivalent to the amount of silver added, by taking 10 minutes. The resulting emulsion was further ripened for 10 minutes.

In the course of growing the grains, the pH and pAg were controlled to be the values shown in Table 4, by adding an aqueous potassium bromide solution and an aqueous acetic acid solution to the reaction chamber. After completing the grain formation, the grains were washed in an ordinary method and the pH and pAg thereof were adjusted to be 5.8 and 8.06 at 40° C., respectively.

TABLE 4

| Silver amount added (%) | 0.0 | 9.0 | 13.0 | 26.0 | 33.0 | 36.0 | 46.0 | 78.0 | 100.0 |
|---|---|---|---|---|---|---|---|---|---|
| AgI content (mol %) | 10 → | 10 → | 30 → | 30 → | 10 → | 10 → | 8 ↓ 0 → | 0 ↑ 1 → | 1 |
| pH | 7.2 → | → → | → → | 7.2 ↓ 6.5 → | → → | → → | → → | → → | 6.5 |
| pAg | 7.8 → | → → | → → | 7.8 ↓ 9.4 → | → → | → → | 9.4 → | 9.7 → | 9.7 |

* (→) indicates a constant or continuous variation; (↑), (↓) indicate each an intermittent variation.

From the results of observing the resulting emulsion grains through a scanning type electron microscope, it was confirmed that the resulting emulsion was an low-aspect monodispersed twinned crystal emulsion having a grain size (i .e., a 1.0 μm-diameter converted into that of a sphere) equivalent to the 1.18 μm-diameter of a circle having an average projected area, a grain size distribution of 86% , an aspect ratio of 1.3 and a proportion of the grains having two parallel twinned-crystal planes of 86% in number. The resulting emulsion is named Em-M.

(Preparation of Em-N)

Em-N was prepared in the same manner as in Em-M, except that lead nitrate was added, to Solution B2, in an amount of $1.0\times10^{-4}$ mols per mol of silver, that corresponded to the standard set by the silver content of the grains already formed.

(Preparation of Em-O)

Em-O was prepared in the same manner as in Em-N, except that lead nitrate was replaced by indium (III) nitrate.

(Preparation of Em-P)

Em-P was prepared in the same manner as in Em-M, except that indium nitrate was added, to Solution E2, in an amount of $1\times10^{-4}$ mols per mol of silver, that corresponded to the standard set by the silver content of the grains already formed.

(Preparation of Em-Q)

Em-Q was prepared in the same manner as in Em-M, except that indium nitrate was added, to the halide solution used when preparing Solution E2, in an amount of $1\times10^{-4}$ mols per mol of silver, that corresponded to the standard set by the silver content of the grains already formed.

(Preparation of Em-R)

Em-R was prepared in the same manner as in Em-M, except that, after completing the grain growth, indium nitrate was added in an amount equivalent to $1\times10^{-4}$ mols per mol of silver and then the emulsion was ripened for 30 minutes before starting a desalting step.

From the results of observing the resulting Em-N through Em-R through a scanning type electron microscope, all of the emulsions were each proved to be a low aspect-ratio monodispersed twinned crystal emulsions having the same grain-size, grain size distribution, aspect ratio, proportion of the grains having two parallel twinned crystal planes as in Em-M.

(Preparation of Emulsion-13)

A part of Em-M was heated up to 50° C. and dissolved. Sensitizing dyes (A) and (B) were each added thereto in the amounts of 110 mg and 100 mg per mol of silver halide, respectively. The resulting mixture was then adsorbed for 15 minutes. Further, sodium thiosulfate pentahydrate, chloro-auric acid and ammonium thiocyanate were each added thereto in the amounts of $3.5\times10^{-6}$ mols, $1.0\times10^{-6}$ mols and $4.0\times10^{-4}$ mols per mol of silver halide, respectively. After the resulting mixture was ripened for 120 minutes, 4-hy-droxy- 6-methyl-(1,3,3a,7)-tetrazaindene was added as a stabilizer and was then cooled down and solidified, so that Emulsion-13 was prepared.

(Preparation of Emulsion-14 through Emulsion-18)

Emulsion-14 through Emulsion-18 were each prepared in the same manner as in Emulsion 13, except that Em-M was replaced by Em-N through Em-R, respectively.

(Preparation of Emulsion-19)

Em-M was heated up to 60° C. and was then dissolved. The pAg of the resulting solution was adjusted to be 9.5. Thereto, indium nitrate in an amount equivalent to $1.0\times10^{-4}$ mols per mol of silver was added. After ripening it for 20 minutes, the resulting emulsion was readjusted at 40° C. to be pH=5.8 and pAg=8.06. Thereafter, the resulting emulsion was treated in the same manner as in Emulsion-13, so that Emulsion-19 was prepared.

(Preparation of Emulsion-20)

Emulsion-20 was prepared in the same manner as in Emulsion-19, except that indium nitrate was not added.

(Preparation of Multilayer-coated Samples 201 through 208 and Evaluation of Sensitometric Results therefrom)

Multilayer-coated samples 201 through 208 were each prepared in the following formulas for the multilayer-coated samples by making use of the Emulsion-13 through Emulsion-20 as the silver iodobromide emulsion I for a high-speed green-sensitive layer (Layer 9).

(Multilayer-coating Formula)

In the following multilayer-coating formulas, the amounts of the compositions added to a silver halide photographic light-sensitive material will be indicated in terms of grams per sq. meter of the light-sensitive material, unless otherwise expressly stated. The silver and silver halides used therein will be indicated in terms of the silver contents thereof. The sensitizing dyes will be indicated in terms of mol numbers per mol of the silver halides used.

| | |
|---|---|
| Layer 1: An antihalation layer | |
| Black colloidal silver | 0.16 |
| UV absorbent (UV-1) | 0.20 |
| High-boiling organic solvent (Oil-1) | 0.16 |
| Gelatin | 1.23 |
| Layer 2: An interlayer | |
| High-boiling organic solvent (Oil-2) | 0.17 |
| Gelatin | 1.27 |
| Layer 3: A low-speed red-sensitive | |
| A silver iodobromide emulsion (having an average grain-size of 0.38 μm and a silver iodide content of 8.0 mol %) | 0.50 |
| A silver iodobromide emulsion (having an average grain-size of 0.27 μm and a silver iodide content of 2.0 mol %) | 0.21 |
| Sensitizing dye (SD-1) | $2.8 \times 10^{-4}$ |
| Sensitizing dye (SD-2) | $1.9 \times 10^{-4}$ |
| Sensitizing dye (SD-3) | $1.9 \times 10^{-5}$ |
| Sensitizing dye (SD-4) | $1.0 \times 10^{-4}$ |
| Cyan coupler (C-1) | 0.48 |
| Cyan coupler (C-2) | 0.14 |
| Colored cyan coupler (CC-1) | 0.021 |
| DIR compound (D-1) | 0.020 |
| High-boiling solvent (Oil-1) | 0.53 |
| Gelatin | 1.30 |
| Layer 4: A medium-speed red-sensitive layer | |
| A silver iodobromide emulsion (having an average grain-size of 0.52 μm and a silver iodide content of 8.0 mol %) | 0.62 |
| A silver iodobromide emulsion (having an average grain-size of 0.38 μm and a silver iodide content of 8.0 mol %) | 0.27 |
| Sensitizing dye (SD-1) | $2.3 \times 10^{-4}$ |
| Sensitizing dye (SD-2) | $1.2 \times 10^{-4}$ |
| Sensitizing dye (SD-3) | $1.6 \times 10^{-5}$ |
| Sensitizing dye (SD-4) | $1.2 \times 10^{-4}$ |
| Cyan coupler (C-1) | 0.15 |
| Cyan coupler (C-2) | 0.18 |
| Colored cyan coupler (CC-1) | 0.030 |
| DIR compound (D-1) | 0.013 |
| High-boiling solvent (Oil-1) | 0.30 |
| Gelatin | 0.93 |
| Layer 5: A high-speed red-sensitive layer | |
| A silver iodobromide emulsion (having an average grain-size of 1.00 μm and a silver iodide content of 8.0 mol %) | 0.27 |
| Sensitizing dye (SD-1) | $1.3 \times 10^{-4}$ |
| Sensitizing dye (SD-2) | $1.3 \times 10^{-4}$ |
| Sensitizing dye (SD-3) | $1.6 \times 10^{-5}$ |
| Cyan coupler (C-2) | 0.12 |
| Colored cyan coupler (CC-1) | 0.013 |
| High-boiling solvent (Oil-1) | 0.14 |
| Gelatin | 0.91 |

-continued

| | |
|---|---|
| Layer 6: An interlayer | |
| High-boiling organic solvent (Oil-2) | 0.11 |
| Gelatin | 0.80 |
| Layer 7: A low-speed green-sensitive layer | |
| A silver iodobromide emulsion (having an average grain-size of 0.38 μm and a silver iodide content of 8.0 mol %) | 0.61 |
| A silver iodobromide emulsion (having an average grain-size of 0.27 μm and a silver iodide content of 2.0 mol %) | 0.20 |
| Sensitizing dye (SD-4) | $7.4 \times 10^{-5}$ |
| Sensitizing dye (SD-5) | $6.6 \times 10^{-4}$ |
| Magenta coupler (M-1) | 0.18 |
| Magenta coupler (M-2) | 0.44 |
| Colored cyan coupler (CM-1) | 0.12 |
| High-boiling solvent (Oil-2) | 0.75 |
| Gelatin | 1.95 |
| Layer 8: A medium-speed green-sensitive layer | |
| A silver iodobromide emulsion (having an average grain-size of 0.59 μm and a silver iodide content of 8.0 mol %) | 0.87 |
| Sensitizing dye (SD-6) | $2.4 \times 10^{-4}$ |
| Sensitizing dye (SD-7) | $2.4 \times 10^{-4}$ |
| Magenta coupler (M-1) | 0.058 |
| Magenta coupler (M-2) | 0.13 |
| Colored cyan coupler (CM-1) | 0.070 |
| DIR compound (D-2) | 0.025 |
| DIR compound (D-3) | 0.002 |
| High-boiling solvent (Oil-2) | 0.50 |
| Gelatin | 1.00 |
| Layer 9: A high-speed green-sensitive layer | |
| Silver iodobromide emulsion I | 1.27 |
| Magenta coupler (M-2) | 0.084 |
| Magenta coupler (M-3) | 0.064 |
| Colored cyan coupler (CM-1) | 0.012 |
| High-boiling solvent (Oil-1) | 0.27 |
| High-boiling solvent (Oil-2) | 0.012 |
| Gelatin | 1.00 |
| Layer 10: A yellow filter layer | |
| Yellow colloidal silver | 0.08 |
| Color-stain inhibitor (SC-2) | 0.15 |
| Formalin scavenger (HS-1) | 0.20 |
| High-boiling solvent (Oil-2) | 0.19 |
| Gelatin | 1.10 |
| Layer 11: An interlayer | |
| Formalin scavenger (HS-1) | 0.20 |
| Gelatin | 0.60 |
| Layer 12: A low-speed blue-sensitive layer | |
| A silver iodobromide emulsion (having an average grain-size of 0.38 μm and a silver iodide content of 3.0 mol %) | 0.22 |
| A silver iodobromide emulsion (having an average grain-size of 0.27 μm and a silver iodide content of 2.0 mol %) | 0.03 |
| Sensitizing dye (SD-8) | $4.9 \times 10^{-4}$ |
| Yellow coupler (Y-1) | 0.75 |
| DIR compound (D-1) | 0.010 |
| High-boiling solvent (Oil-2) | 0.30 |
| Gelatin | 1.20 |
| Layer 13: A medium-speed blue-sensitive layer | |
| A silver iodobromide emulsion (having an average grain-size of 0.59 μm and a silver iodide content of 8.0 mol %) | 0.30 |
| Sensitizing dye (SD-8) | $1.6 \times 10^{-4}$ |

-continued

| | |
|---|---|
| Sensitizing dye (SD-9) | $7.2 \times 10^{-5}$ |
| Yellow coupler (Y-1) | 0.10 |
| DIR compound (D-1) | 0.010 |
| High-boiling solvent (Oil-2) | 0.046 |
| Gelatin | 0.47 |
| Layer 14: A high-speed blue-sensitive layer | |
| A silver iodobromide emulsion (having an average grain-size of 1.00 μm and a silver iodide content of 10.0 mol %) | 0.85 |
| Sensitizing dye (SD-8) | $7.3 \times 10^{-5}$ |
| Sensitizing dye (SD-9) | $2.8 \times 10^{-5}$ |
| Yellow coupler (Y-1) | 0.11 |
| High-boiling solvent (Oil-2) | 0.046 |
| Gelatin | 0.80 |
| Layer 15: Protective layer 1 | |
| A silver iodobromide emulsion (having an average grain-size of 0.08 μm and a silver iodide content of 1.0 mol %) | 0.40 |
| UV absorbent (UV-1) | 0.065 |
| UV absorbent (UV-2) | 0.10 |

-continued

| | |
|---|---|
| High-boiling solvent (Oil-1) | 0.07 |
| High-boiling solvent (Oil-3) | 0.07 |
| Formalin scavenger (HS-1) | 0.40 |
| Gelatin | 1.31 |
| Layer 16: Portective layer 2 | |
| An alkali-soluble matting agent (having an average particle size of 2 μm) | 0.15 |
| Polymethyl methacrylate (having an average particle size of 3 μm) | 0.04 |
| Lubricant (WAX-1) | 0.04 |
| Gelatin | 0.55 |

Besides the above-given compositions, coating aids Su-1 and Su-2, a viscosity controller, layer hardeners H-1 and H-2, stabilizer ST-1, antifoggants AF-1 and AF-2 having a weight average molecular weights of 10,000 and 1,100,000 respectively, and antiseptic D1-1 were each added, provided that D1-1 was added in an amount of 9.4 mg/m$^2$.

The chemical structures of the compounds used in the samples will be shown below.

C-1

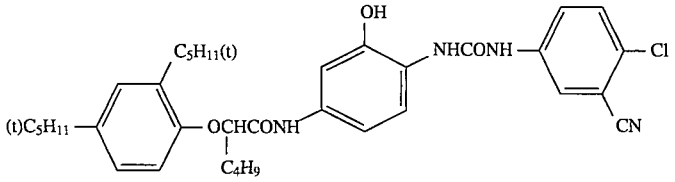

C-2

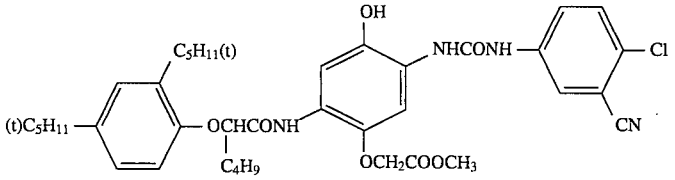

M-1

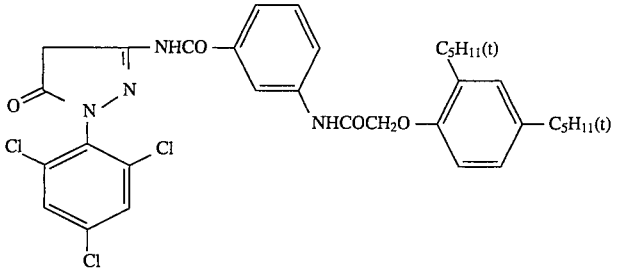

M-2

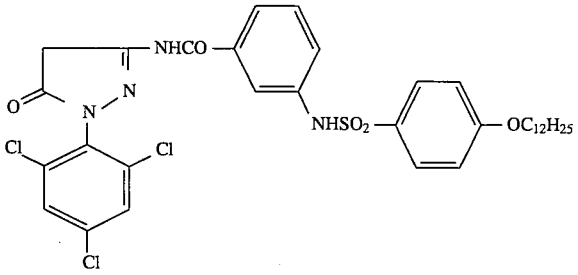

-continued
M-3
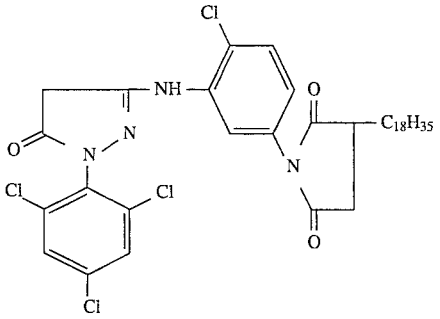
Y-1
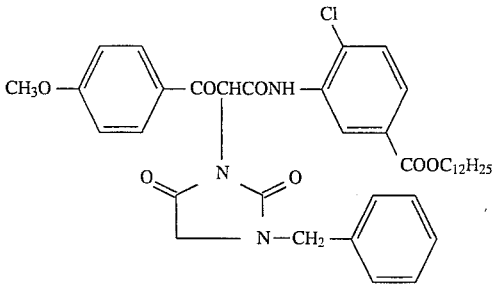
CC-1
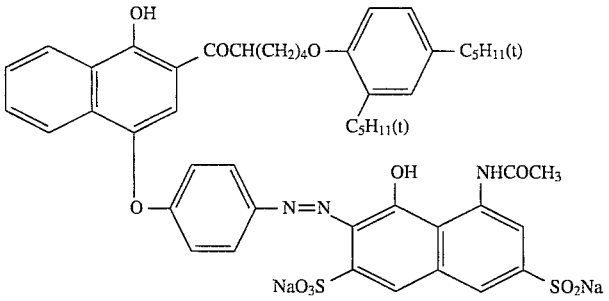
CM-1
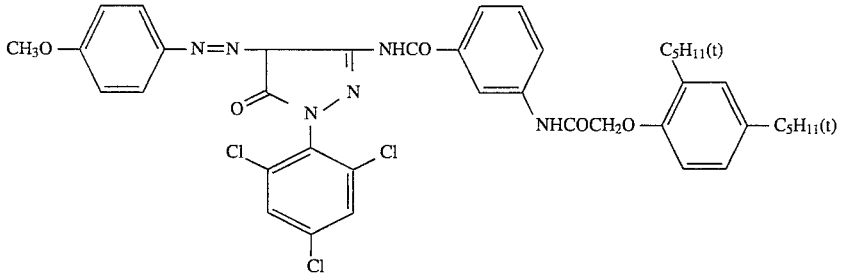
D-1
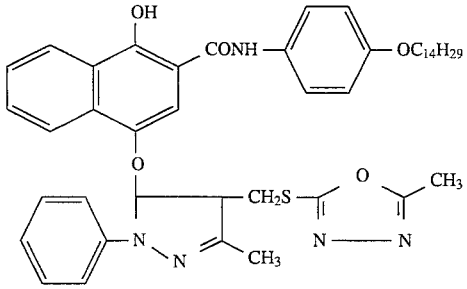

-continued
D-2
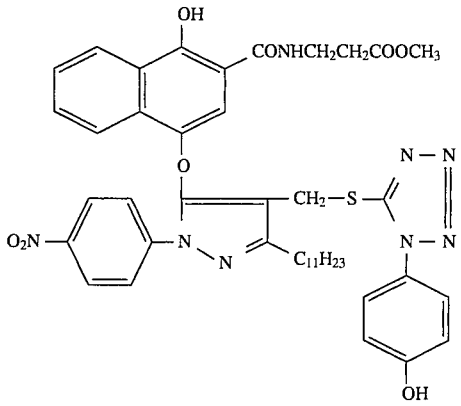
D-3
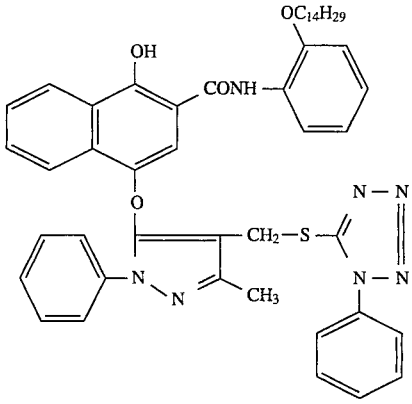
Oil-1
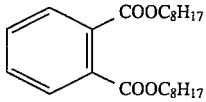
Oil-2
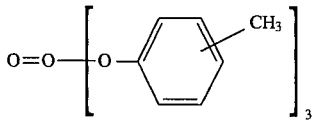
Oil-3
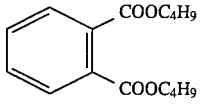
SC-2
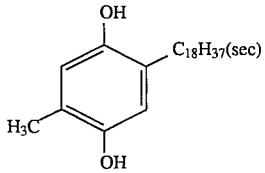
UV-1
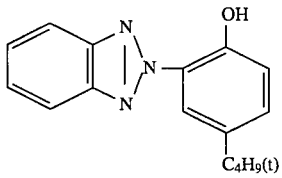
UV-1
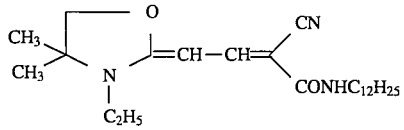

-continued
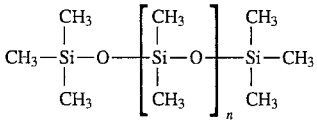
WAX-1
Weight average molecular weight MW: 3,000
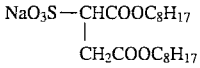
Su-1
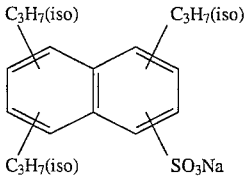
Su-2
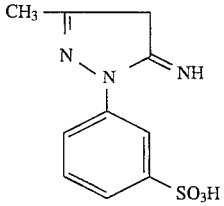
HS-1
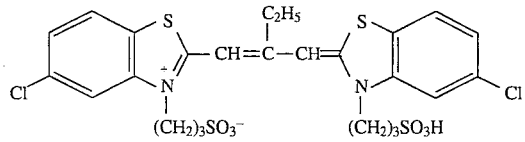
SD-1
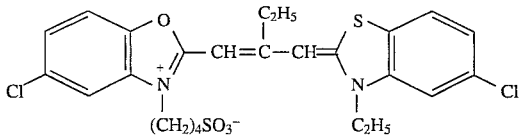
SD-2
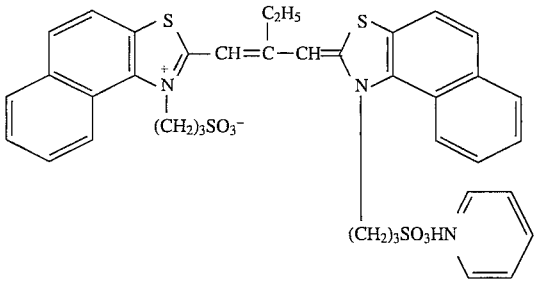
SD-3
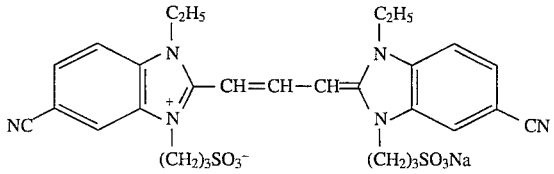
SD-4
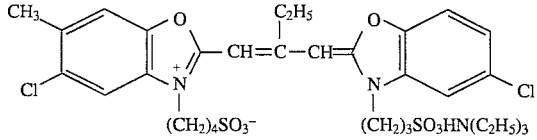
SD-5

-continued
SD-6
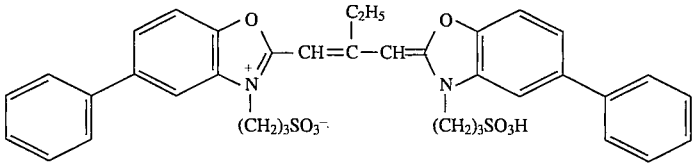
SD-7
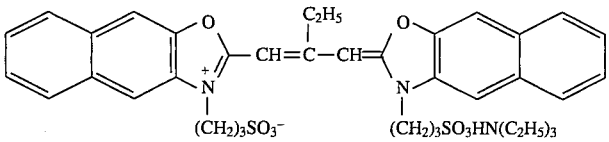
SD-8
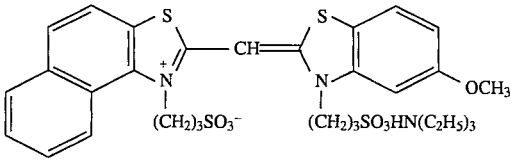
SD-9
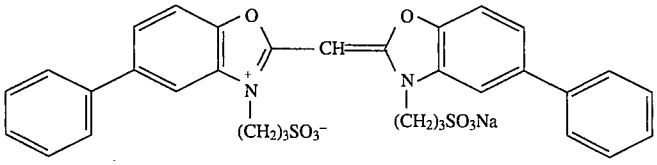
H-1
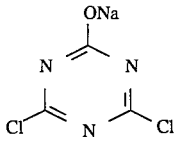
$(CH_2{=}CHSO_2CH_2)_2O$ H-2
ST-1
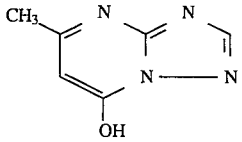
AF-1
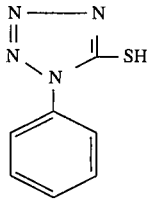
AF-2
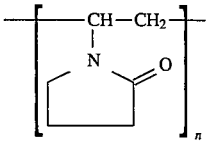
n: Polymerization degree
(A mixture of the following 3 components) DI-1
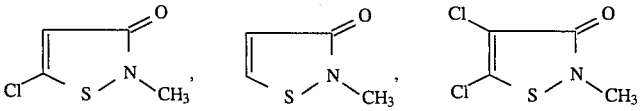
(Component A) (Component B) (Component C)
Component A: Component B: Component C = 50:46:4
(in mol ratio)

The resulting multilayer -coated samples 201 through 208 were each cut into strips. A part of each stripped sample were exposed wedgewise to white light (for an exposure time of 1/100th sec.) and then the fog and sensitivity thereof were evaluated. Another part of each sample were exposed wedgewise to light for an exposure time of 1/100th sec.) and, after storing in the conditions of 55° C. and 20% RH for 2 days, they were developed, and the preservability of the latent images were evaluated.

The development process was carried out by making use of the processing solutions having the same formulas as in Example-1 and by taking the following processing time.

| Processing steps (at 38° C.) | |
|---|---|
| Color developing | 3 min. 15 sec. |
| Bleaching | 6 min. 30 sec. |
| Washing | 3 min. 15 sec. |
| Fixing | 6 min. 30 sec. |
| Washing | 3 min. 15 sec. |
| Stabilizing | 1 min. 30 sec. |
| Drying | |

Table 5 shows the results of the evaluation on the fog production, sensitivity, RMS graininess and latent image preservability of each green-sensitive layer.

Each of the latent image preservability was obtained in terms of a sensitivity obtained after completing a preservation and the sensitivity value was expressed by a value relative to the sensitivity obtained by same-day developing the subject sample, that was regarded as the reference value of 100.

From the results shown in Table 5, it was proved that, also in the evaluation made with the color-negative multilayer-coated sample group, the emulsion containing an indium compound of the invention can be a remarkably effective means for achieving a high sensitization without inducing any fog-increase nor graininess deterioration. It was also proved that the same sensitization effects as mentioned above can be enjoyed, even when an indium compound of the invention should be added at any time after completing the grain formation but not in the course of forming the grain, for example, even before starting a desalting step or before starting a chemical ripening step.

In the conventional emulsions containing an iron salt (or a lead salt and so forth), there has been such a problem that an excessive sensitivity increase has been observed in a post-exposure preservation. In contrast thereto, the emulsions of the invention were proved to be excellent also in latent image preservability.

What is claimed is:

1. A silver halide photographic light-sensitive emulsion

TABLE 5

| Sample No. | Compound added (Amt added per mol of Ag) | Where & when added | Fog | Sensitivity | Graininess | Latent image preservability | Invention/ Comparison |
|---|---|---|---|---|---|---|---|
| 201 | — | — | 0.12 | 100 | 100 | 95 | Comparison |
| 202 | Potassium ferrocyanide, $1 \times 10^{-4}$ mols | Solution B2 | 0.15 | 132 | 117 | 135 | Comparison |
| 203 | Indium nitrate, $1 \times 10^{-4}$ mols | Solution B2 | 0.12 | 130 | 102 | 97 | Invention |
| 204 | Indium nitrate, $1 \times 10^{-4}$ mols | Solution E2 | 0.12 | 125 | 101 | 96 | Invention |
| 205 | Indium nitrate, $1 \times 10^{-4}$ mols | Halide solution in preparing Solution E2 | 0.11 | 133 | 98 | 95 | Invention |
| 206 | Indium nitrate, $1 \times 10^{-4}$ mols | Between completion of grains and the starting of desalting | 0.13 | 120 | 100 | 101 | Invention |
| 207 | Indium nitrate, $1 \times 10^{-4}$ mols | Before chemical ripening | 0.13 | 115 | 105 | 100 | Invention |
| 208 | — | — | 0.12 | 96 | 104 | 99 | Comparison |

Sensitivity of the samples were obtained in terms of the reciprocals of an exposure quantity necessary for giving a density of a fog density+0.1, and each of the values thereof was expressed by a value relative to the sensitivity of Sample 201 obtained when exposing it to light for 1/100th sec., that was regarded as the reference value of 100.

In Table 5, the fog densities were expressed by the difference between the fog density of a sample developed in an ordinary process and the fog density of the sample developed in a developing agent-free process.

Each RMS graininess of the samples was obtained in terms of the standard deviation of the density variations produced when scanning a dye image having a density of a fog density+0.8 through a microdensitometer having an circular scanning aperture of 25 μm, and each of the resulting RMS graininess was expressed by a value relative to the value obtained from Sample 201 that was regarded as the reference value of 100.

comprising core/shell type silver iodobromide grains, said silver iodobromide grains having inside a high silver iodide containing phase having a silver iodide content of not less than 8 mol %, said silver iodobromide grains further containing at least one kind of indium compound, wherein the silver iodobromide grains are chemically sensitized, and said indium compound is introduced within a period from starting formation of said silver iodobromide grains to starting the chemical sensitization.

2. The silver halide photographic light-sensitive emulsion of claim 1, wherein said indium compound is a trivalent compound.

3. The silver halide photographic light-sensitive emulsion of claim 1, wherein said silver iodobromide grains are twinned crystal silver iodobromide grains having two {111} planes parallel to each other.

4. The silver halide photographic light-sensitive emulsion of claim 1, wherein said silver iodobromide grains are tabular shaped silver iodobromide grains, and an average aspect ratio of said tabular shaped silver iodobromide grains is less than 5.

5. The silver halide photographic light-sensitive emulsion of claim 4, wherein said aspect ratio is not less than 1.1 and less than 4.5.

6. The silver halide photographic light-sensitive emulsion of claim 5, wherein said aspect ratio is not less than 1.2 and less than 4.

7. The silver halide photographic light-sensitive emulsion of claim 1, wherein each grain size of said silver iodobromide grains is within the range of 0.1 μm to 5.0 μm.

8. The silver halide photographic light-sensitive emulsion of claim 7, wherein said each grain size is within the range of 0.2 μm to 4.0 μm.

9. The silver halide photographic light-sensitive emulsion of claim 8, wherein said each grain size is within the range of 0.3 μm to 3.0 μm.

10. The silver halide photographic light-sensitive emulsion of claim 1, wherein said silver iodobromide grains are monodispersed, and an amount by weight of silver iodobromide grains having grain sizes within the range of ±20% of an average grain size is not less than 60%.

11. The silver halide photographic light-sensitive emulsion of claim 10, wherein said amount is 70%.

12. The silver halide photographic light-sensitive emulsion of claim 1, wherein said silver iodobromide grains are monodispersed and have a grain size distribution of not more than 20%, said grain size distribution being defined by the following Formula A:

Grain size distribution (%)=(Standard deviation/Average grain size)×100.

13. The silver halide photographic light-sensitive emulsion of claim 1, wherein the silver iodide content of the silver iodobromide grains is within the range of 0.1 to 15 mol %, in terms of an average silver iodide content.

14. The silver halide photographic light-sensitive emulsion of claim 13, wherein the silver iodide content of the silver iodobromide grains is within the range of 5 mol % to 12 mol %, in terms of an average silver iodide content.

15. The silver halide photographic light-sensitive emulsion of claim 14, wherein said silver iodide content of the silver iodobromide grains is within the range of 6 mol % to 10 mol % in terms of an average silver iodide content.

16. The silver halide photographic light-sensitive emulsion of claim 1, said silver iodobromide grains each having an outermost layer with a silver iodide content of not more than 10 mol %.

17. The silver halide photographic light-sensitive emulsion of claim 16, said silver iodobromide grains further having an interlayer set between said outermost layer and said high silver iodide containing phase, wherein the silver iodide content of said interlayer is within the range of 10 to 22 mol %.

* * * * *